(12) United States Patent
Ramstad (10) Patent No.: US 11,535,071 B2
(45) Date of Patent: Dec. 27, 2022

(54) RECREATIONAL COLLAPSING TOW BAR WITH UNIVERSAL ROTATIONAL CONNECTION

(71) Applicant: Robert J Ramstad, East Bethel, MN (US)

(72) Inventor: Robert J Ramstad, East Bethel, MN (US)

( * ) Notice: Subject to any disclaimer, the term of this patent is extended or adjusted under 35 U.S.C. 154(b) by 125 days.

(21) Appl. No.: 16/864,339

(22) Filed: May 1, 2020

(65) Prior Publication Data

US 2021/0046790 A1 Feb. 18, 2021

Related U.S. Application Data (62) Division of application No. 15/819,671, filed on Nov. 21, 2017, now Pat. No. 10,675,930.

(51) Int. Cl.
*B60D 1/155* (2006.01)
*B60D 1/14* (2006.01)

(52) U.S. Cl.
CPC ............. *B60D 1/155* (2013.01); *B60D 1/143* (2013.01)

(58) Field of Classification Search
CPC ................................ B60D 1/143; B60D 1/155
USPC ........................................................ 280/482
See application file for complete search history.

(56) References Cited

U.S. PATENT DOCUMENTS

| 2,444,944 | A | | 7/1948 | Minter |
| 3,116,076 | A | | 12/1963 | Zingsheim |
| 3,797,846 | A | | 3/1974 | Pevic |
| 4,593,925 | A | * | 6/1986 | Laie ................... B60D 1/155 280/484 |
| 4,699,394 | A | | 10/1987 | Laie |
| 6,283,490 | B1 | | 9/2001 | Sciannanteno et al. |
| 7,959,180 | B1 | | 6/2011 | Huston et al. |
| 2002/0158444 | A1 | | 10/2002 | DeTournay |
| 2003/0132607 | A1 | | 7/2003 | Pan |

* cited by examiner

*Primary Examiner* — Tony H Winner
*Assistant Examiner* — Felicia L. Brittman
(74) *Attorney, Agent, or Firm* — Gutwein Law; Greg N. Geiser

(57) ABSTRACT

A recreational collapsing/expanding tow bar for towing a vehicle. The tow bar contains a collapsing/expanding middle part and a pair of attachment ends. The attachment ends include a sleeve, fastener, and bar end. The fastener includes a first end, a second end, a ball, and a shaft. The fastener is secured within the sleeve and retained with the bar end. The fastener can be used in a fixed rigid position or a rotational position. The collapsing/expanding middle part is rigid and adjustable to various distances between the towing and towed vehicle, wherein the device is compact in size and easily stored.

Additional towing connectors are disclosed to engage a snowmobile and motorcycle for being towed.

2 Claims, 9 Drawing Sheets

RECREATIONAL COLLAPSING TOW BAR WITH UNIVERSAL ROTATIONAL CONNECTION

CROSS REFERENCE TO RELATED APPLICATION

This application is a divisional application of U.S. patent application Ser. No. 15/819,671 filed 21 Nov. 2017, by the above named inventor, and is herein incorporated by reference.

FEDERALLY SPONSORED RESEARCH

Not Applicable

SEQUENCE LISTING OR PROGRAM

Not Applicable

FIELD OF THE INVENTION

The present invention relates to a device used to tow a vehicle behind another vehicle, more specifically, a collapsible device that can be easily stored on a motorcycle or recreational vehicle and used to tow a disabled vehicle.

BACKGROUND OF THE INVENTION

The present invention relates to a recreational collapsing tow-bar for towing one vehicle by another. In various embodiments, the towed and towing vehicles maybe any combination of: motorcycle, ATV, snowmobile, car, truck, or boat.

The present invention permits the towing of a disabled recreational vehicle by another recreational vehicle. In this way, a group of people traveling together will be able to take the disabled vehicle to a repair facility rather than leaving it behind.

The present invention in its collapsed state is easily transported on a vehicle, either a potential towing vehicle or a potential towed vehicle. When fully extended, the tow-bar will be rigid and will pivot and swivel to allow the towed vehicle to easily follow the towing vehicle.

Further, various and specific attachments are designed and adapted for use in towing specific vehicle types including snowmobiles and motorcycles. In particular, a folding and locking snowmobile attachment is provided for both securing and allowing for towing of a snowmobile.

The following United States Patents have been published that have certain similarities to the present invention: U.S. Pat. Nos. 1,390,942; 4,114,919; 5,039,120; 5,454,578; 5,749,592; 6,042,138; 6,155,582; 6,290,247; 6,561,533; 6,796,575; 6,938,910. Applicant makes no assertion that the above is a complete list of publications that would be disclosable under 37 C.F.R. § 1.56, or that any of the above publications are "material to patentability" as defined therein in regard to the present patent application.

SUMMARY OF THE INVENTION

A recreational collapsing tow-bar for towing one vehicle by another. In various embodiments, the towed and towing vehicles may be any combination of: motorcycle, ATV, snowmobile, car, truck, or boat.

The collapsible tow-bar comprises a collapsing/expanding middle part and a pair of attachments ends. The attachment ends are removably connected to the collapsing/expanding middle part and removably connectable to a towed vehicle or towing vehicle using an attachment coupling. The attachment ends are movable between a fixed position and rotational position though a mechanical coupling.

The collapsing/expanding middle part is of a hollow tubular construction and comprises at least one outer tube receiving telescopically at least one inner tube. Preferably, the collapsing expanding middle part comprises a first tube, a second tube, a third tube, and a fourth tube. In this configuration the tubes will be telescopically nested together and adjustable from a compressed position to an extended position and to various distances between the compressed position and extended position by connections through a pair of coaxial apertures in the inner tube or outer tube. In the preferred embodiment, a spring-loaded fastener and the corresponding pair of coaxial apertures are used to adjust the length of the collapsing/expanding middle part. The spring-loaded fastener is comprised of a pair of end caps and a compliant member received within a hollow sleeve. This spring-loaded fastener is used throughout the device for removable connections. Preferably, the compliant member is a steel spring.

According to this configuration, the user will depress the pair of end caps releasing them from the apertures and expanding the tube by grasping and pulling it to the next apertures wherein the spring-loaded fastener will securely engage the next apertures. To collapse the device, the pair of end caps are depressed and the tubes are compressed.

The pair of attachment ends each comprise in combination, a sleeve, a fastener, and a bar end. The sleeve is cylindrical shaped and formed with a cavity defining an interior. The sleeve is sized to receive the fastener and allow for movement of the fastener in both a rotational and horizontal direction. The cavity extends the length of the interior and has a first cavity end and a second cavity end. The first cavity end is conically shaped to allow for rotation of the fastener and creates a stop point for the extension of the fastener. The second cavity end is female threaded to receive a male end of the bar end.

The fastener is received within the sleeve and includes a first fastener end, a second fastener end, a shaft, and a ball. The fastener is one-piece with individual fastener elements connected in series and coplanar. The first fastener end is shaped to resemble the male end of an air (pneumatic) fitting coupler such as a type A, type M, or type V Milton style fitting or other similar fitting. This end shape allows for the quick connect of the fastener to the attachment point on the towed vehicle or towing vehicle. The shaft connects the first fastener end to the ball and extends a length that allows the first fastener end to protrude from the cavity of the sleeve when the fastener is received within the sleeve.

The ball is sized for receipt within the cavity of the sleeve and allows for smooth rotation of the fastener. The diameter of the ball is sized to correspond to the diameter of the cavity of the sleeve. The second fastener end is connected to the ball opposite the shaft and extends outward from the ball. The second fastener end forms a threaded male connection for receipt within the bar end.

The bar end has a first bar end and second bar end. The first bar end has an outer surface and an inner aperture. The outer surface is male threaded and sized for receipt within the sleeve. The inner aperture is female threaded and sized to receive the second fastener end. The second bar end is hollow and sized for receipt within the tubular construction of the collapsing/expanding middle part. A bar end detent is secured within the second bar end. The detent extends outward from the second end perpendicular to a length of the expanding/collapsing middle part and engages a corresponding aperture on the expanding/collapsing middle part.

The pair of attachment ends is assembled with the fastener placed into the sleeve and the bar end attached to the sleeve to secure and retain the fastener within the sleeve. According to this configuration, the fastener may be secured parallel to the length the expanding/collapsing middle part and fixed rigid, by securing the second fastener end within the inner aperture. Additionally, the fastener may be disengaged from the inner aperture and be allowed to rotate freely within the cavity the sleeve. This configuration allows the fastener to rotate through a range of 360 degrees to facilitate multi directional towing forces.

The attachment ends are designed for securing between a towing and towed vehicle through communication with the first fastener end and pneumatic style quick female coupler for receipt of the male end air fitting coupler such as a type A, type M, or type V Milton style fitting of the fastener. Accordingly, the connections can be made quickly and securely. Additionally, the ends can be easily interchanged, wherein the fastener end includes the female quick coupler and the towing vehicle includes an attachment with the male end.

Various vehicle connection devices are disclosed which are specifically designed for engaging with the tow-bar of the present invention. One such connection device is an attachment specifically designed in combination to secure a snowmobile and provide an attachment for towing. This attachment is comprised of a pair of opposed arms in hinged communication through connection with a center portion. This center portion includes a towing attachment for coupling with an appropriate towing connector. The ends of the opposed arms include an attachment hook. The attachment hooks including a locking portion and designed to engage the ski handle or, as they are otherwise known, the ski loops on the skis of the snowmobile. Accordingly, the length and angle of the arms is adjustable to engage varies ski distances and types.

Another such connection device is an attachment specifically designed in combination to secure a motorcycle and provide an attachment for towing. This attachment is comprised of a pair of straps on opposed sides of an adjustable connecting portion to engage the opposed fork tubes of the fork assembly of a motorcycle.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS., with "front," "back," and "rear" being relative to the apparatus.

These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIG. 1-FIG. 6 there is shown a collapsible tow bar according to the present invention. In various embodiments, the collapsible tow bar may be secured between a towed vehicle and towing vehicle to facilitate movement of the towed vehicle. The towed and towing vehicles may be any combination of: motorcycle, ATV, snowmobile, car, truck, or boat.

The collapsible tow-bar comprises a collapsing/expanding middle part 100 and a pair of attachments ends 200. The attachment ends 200 are removably connected to the collapsing/expanding middle part 100 and removably connectable to a towed vehicle or towing vehicle using an attachment coupling. The attachment ends 200 are movable between a fixed position 230 and rotational position 240.

Figures 1, 2, 3:
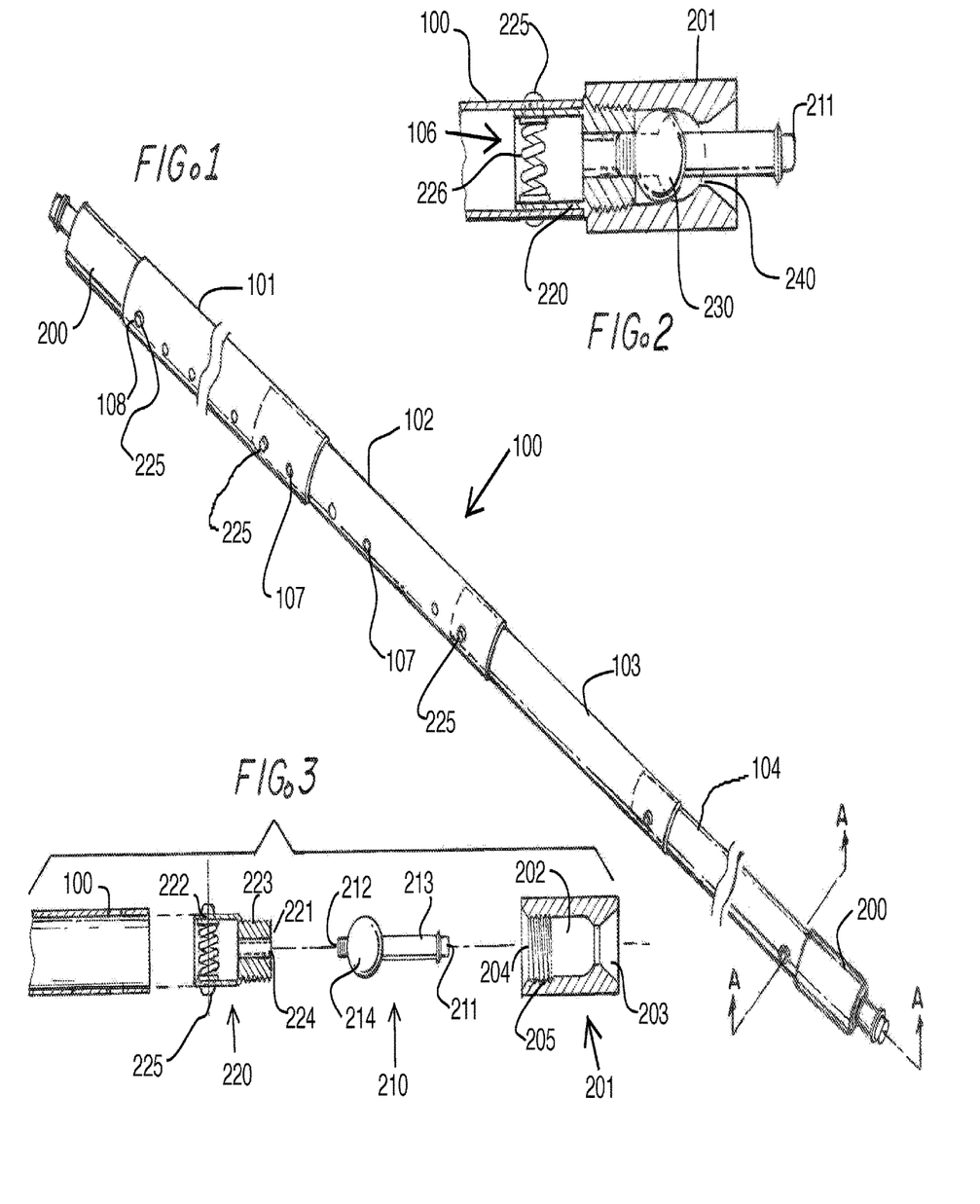
FIG. 1 is an isometric view of the recreational collapsing tow-bar in an extended position of the present invention.
FIG. 2 is a side view of an attachment end engaged with an expanding/collapsing middle part of the recreational collapsing tow-bar of the present invention.
FIG. 3 is a side exploded view of the attachment end of the recreational collapsing tow-bar of the present invention.
Figure 4:
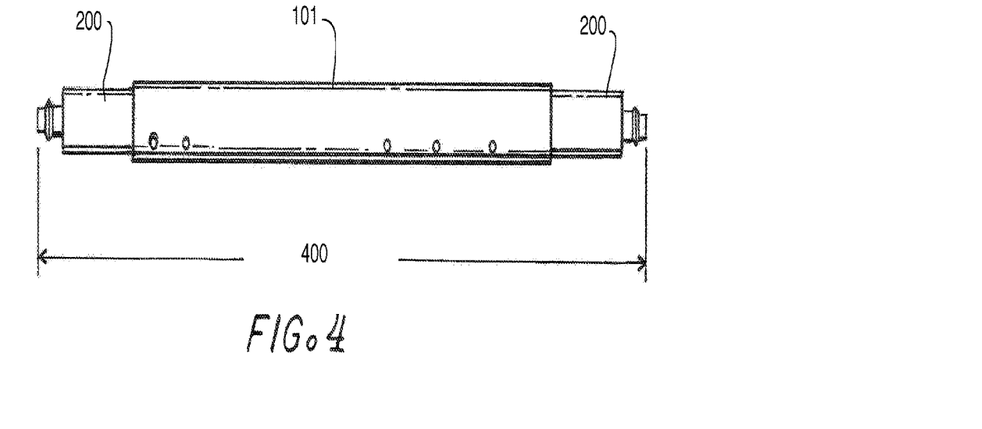
FIG. 4 is a side view the recreational collapsing tow-bar in a compressed position, according to the present invention.
Figure 5:
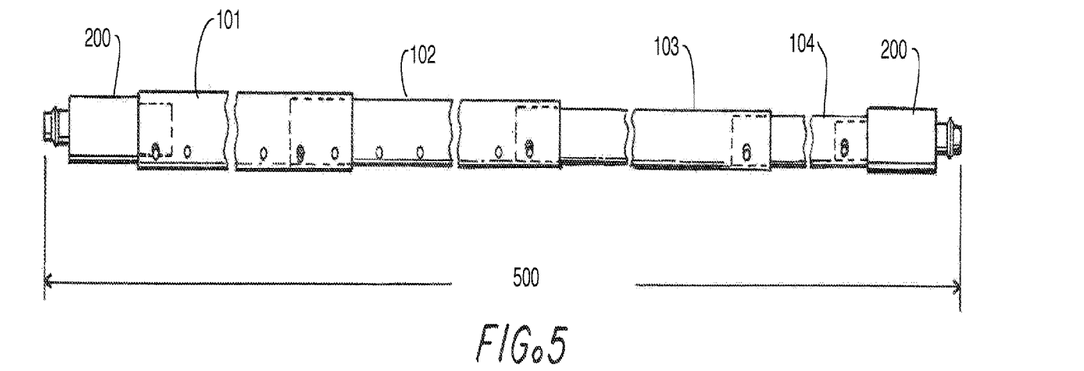
FIG. 5 is a side view of the recreational collapsing tow-bar in an extended position, according to the present invention.

The collapsing/expanding middle part 100 is of hollow tubular construction and comprises at least one outer tube 101 receiving telescopically at least one inner tube 102. Preferably, the collapsing expanding middle part 100 comprises a first tube 101, a second tube 102, a third tube 103, and a fourth tube 104. In this configuration the tubes 101-104 will be telescopically nested together and adjustable from a compressed position 400 to an extended position 500 and to various distances between the compressed position 400 and extended position 500 by connections through a a pair of coaxial apertures 107 in the inner tube 101 or outer tube 102. In the preferred embodiment, a spring-loaded fastener 106 and the corresponding apertures 107 are used to adjust the length of the collapsing/expanding middle part 100. The spring-loaded fastener 106 is comprised of a pair of end caps 225 and a compliant member 226 received within a hollow sleeve. This spring-loaded fastener 106 is used throughout the device 100 for removable connections. Preferably, the compliant member 226 is a steel spring with a length of one inch for resiliency and durability, although other similar compliant members may be used.

According to this configuration, the user will depress the pair of end caps 225 releasing them from the apertures 107 and expanding the collapsing/expanding middle part 100 tube by grasping and pulling it to the next apertures 107 where the spring-loaded fastener 106 will securely engage the next apertures 107. To collapse the device, the pair of end caps 225 is depressed and the tubes 101-104 are compressed. Each tube 101-104 will contain a plurality of coaxial apertures 107 to retain the end caps 225 of the spring-loaded fastener 106. Preferably, the device will extend from a compressed position 400 length of approximately fourteen (14) inches to an extended position 500 length of approximately six and one-half (6.5) feet.

The pair of attachment ends 200 each comprise in combination a sleeve 201, a fastener 210, and a bar end 220. The sleeve 201 is cylindrical shaped and formed with a cavity 202 defining an interior. The sleeve 201 is sized to receive the fastener 210 and allow for movement of the fastener 210 in both a rotational and horizontal direction. The cavity 202 extends the length of the interior and has a first cavity end 203 and second cavity end 204. The first cavity end 203 is conically shaped to allow for rotation of the fastener 210 and create a stop point for the extension of the fastener 210. The second cavity end 204 is female threaded 205 to receive a male end 223 of the bar end 220.

The fastener 210 is received within the sleeve 201 and includes a first fastener end 211, a second fastener end 212, a shaft 213, and a ball 214. The fastener 210 is one-piece with the individual fastener elements 211-214 connected in series and coplanar. The first fastener end 211 is shaped to resemble the male end of an air fitting coupler such as a type A, type M, or type V Milton style fitting or other similar fitting. This end shape allows for the quick connect of the fastener 210 to an attachment point on the towed vehicle or towing vehicle. The shaft 213 connects the first fastener end 211 to the ball 214 and extends a length that allows the first fastener end 211 to protrude from the cavity 202 of the sleeve 201 when the fastener 210 is received within the sleeve 201.

The ball 214 is sized for receipt within the cavity 202 of the sleeve 201 and allows for smooth rotation of the fastener 210. The diameter of the ball 214 is sized to correspond to the diameter of the cavity 202 of the sleeve 201. The second fastener end 212 is connected to the ball 214 opposite the shaft 213 and extends outward from the ball 214. The second fastener end 212 forms a threaded male connection for receipt within the bar end 220.

The bar end 220 has a first bar end 221 and second bar end 222. The first bar end 221 has an outer surface 223 and an inner aperture 224. The outer surface 223 is male threaded and sized for receipt within the sleeve 201. The inner aperture 224 is female threaded and sized to receive the second fastener end 212. The second bar end 222 is hollow and sized for receipt within the tubular construction of the collapsing/expanding middle part 100. The spring-loaded fastener 106 is secured within the second bar end 222. The pair of end caps 225 extend outward from the second end 222 perpendicular to a length of the expanding/collapsing middle part 100 and engage a corresponding aperture 108 on the expanding/collapsing middle part 100.

The pair of attachment ends 200 are assembled with the fastener 210 placed into the sleeve 201 and the bar end 220 attached to the sleeve 201 to secure and retain the fastener 210 within the sleeve 201. According to this configuration, the fastener 210 may be secured parallel to the length of the expanding/collapsing middle part 100 and fixed rigid, by securing the second fastener end 212 within the inner aperture 224. Additionally, the fastener 210 may be disengaged from the inner aperture 224 and be allowed to rotate freely within the cavity 202 the sleeve 201. This configuration allows the fastener 210 to rotate through a range of 360 degrees to facilitate multi directional towing forces.

Figure 6:
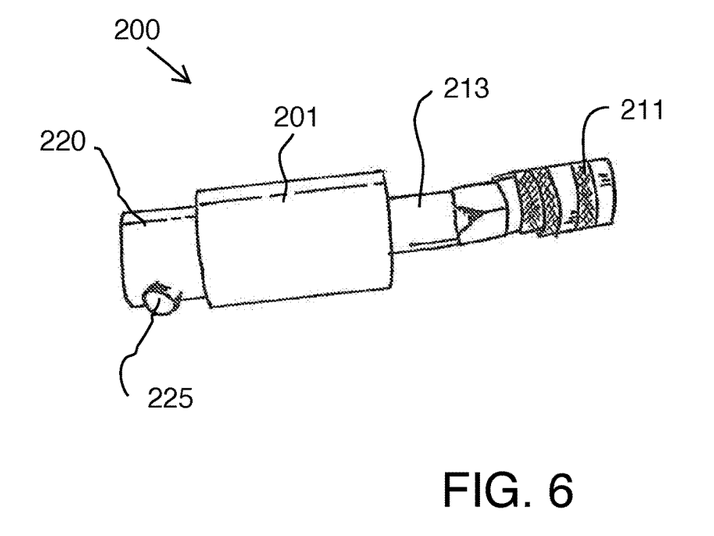
FIG. 6 is an isometric view of an alternate attachment end, according to the present invention.

Alternately, as is shown in FIG. 6, the first fastener end 211 may be the reverse of the male style air coupling and be a female end coupling to receive the male fitting. Accordingly, an attachment end 200 of this type can be utilized to a secure a device or component with a male style end. The attachment ends 200 can be utilized in any desired configuration (male or female) depending upon the type of attachments of utilized and wherein in the bar 100 may be fitted with both ends including a male first fastener end 211, both ends have a female fastener end 211, or both ends alternating between a male and female first fastener end 211.

Referring now to FIGS. 7-9, 15-16, in a first embodiment of a snowmobile attachment device 600 designed for engagement one of the attachment ends 200 with bar 100 of the present invention and for securing to a snowmobile. The device 600 is comprised of a pair of arms 601, 602 in hinged communication through a hinge 603 and movable from a folded position to an extended position. The first arm 601 having an attached end 611 and free end 612 opposed the attached end 611, the distance between the attached end 611 and free end 612 defining the length of the first arm 601. The length of the first arm 601 adjustable, wherein the first arm 601 is comprised of a movable arm received within a hollow tubular body. The first arm 601 length movable through communication between a plurality of apertures 610 and spring-loaded fastener 106 end cap 225. The free end 612 includes a hoop end 613. The hoop end 613 movable from an open to a closed position and designed to secure the ski handles or ski loops on the front of the skis of a snowmobile.

The second arm 602 having an attached end 621 and free end 622 opposed the attached end 621, the distance between the attached end 621 and free end 622 defining the length of the second arm 602. The length of the second arm 602 adjustable, wherein the second arm 602 is comprised of a movable arm received within a hollow tubular body. The second arm 602 length movable through communication between a plurality of apertures 620 and spring-loaded fastener 106 end cap 225. The free end 622 includes a hoop end 623. The hoop end 623 movable from an open to a closed position and designed to secure one ski loop/handle of the skis of a snowmobile opposite the hoop end 613 of the first arm 601, wherein the device 600 spans the distance between the skis of the snowmobile and engages the individual ski handles/loops on the front top portion of the snowmobile skis. The attached end 621 of the second arm 602 positioned adjacent the attached end 611 of the first arm 601 when in the extended position, wherein the extended length of the attachment is the distance between the free end 612 and free end 622 and adjusted to span the skis.

Figure 7:
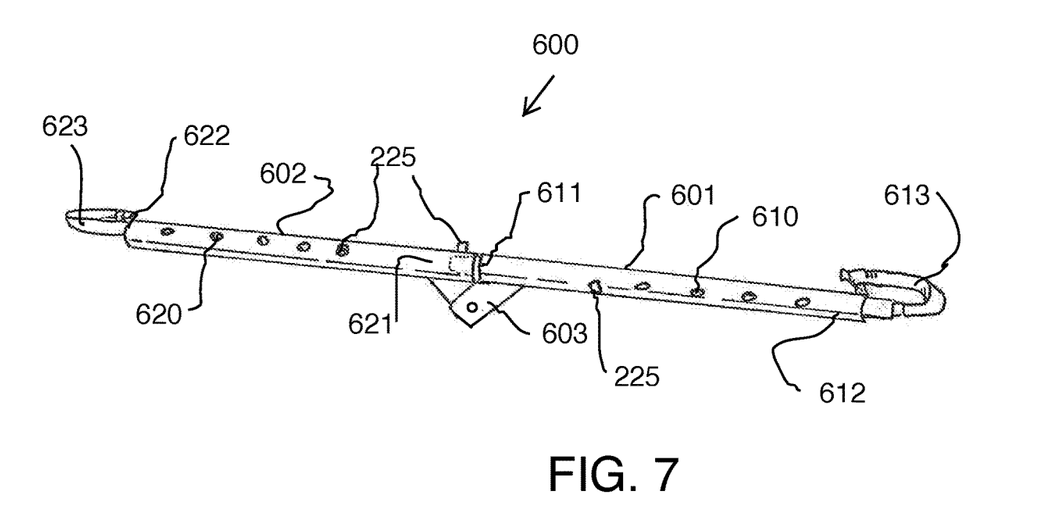
FIG. 7 is an isometric view of a first side of a first embodiment of a snowmobile attachment device, according to the present invention.
Figure 8:
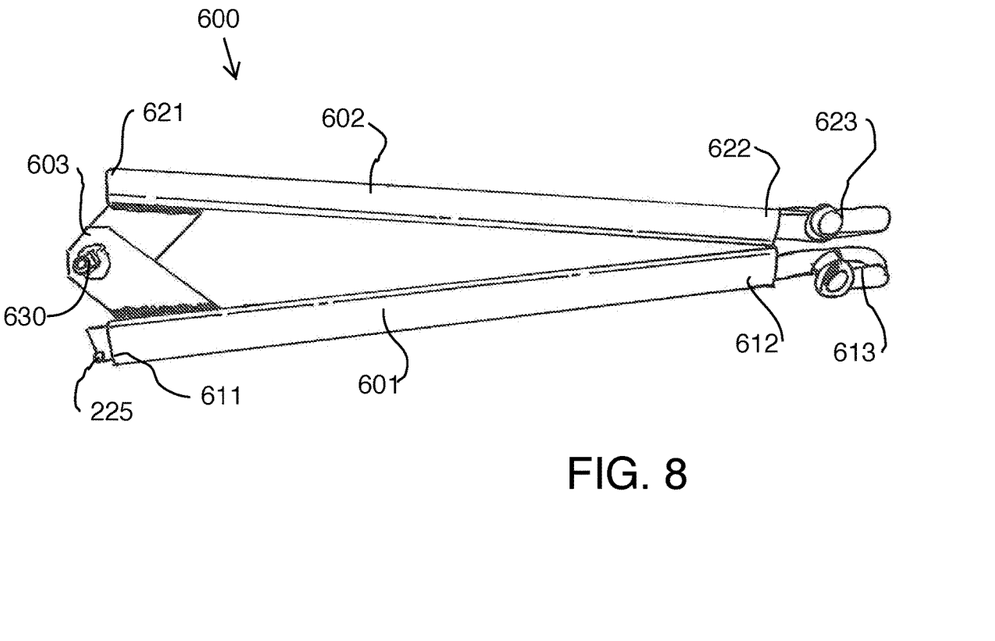
FIG. 8 is a side view of the first embodiment of a snowmobile attachment device in a folded position, according to the present invention.
Figure 9:
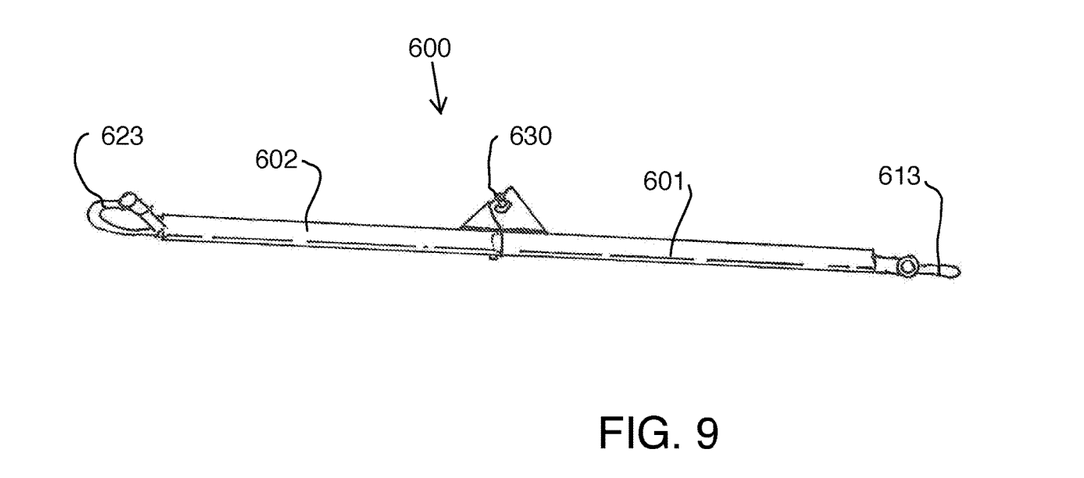
FIG. 9 is an isometric view of a second side of the first embodiment of a snowmobile attachment device, according to the present invention.
Figure 10:
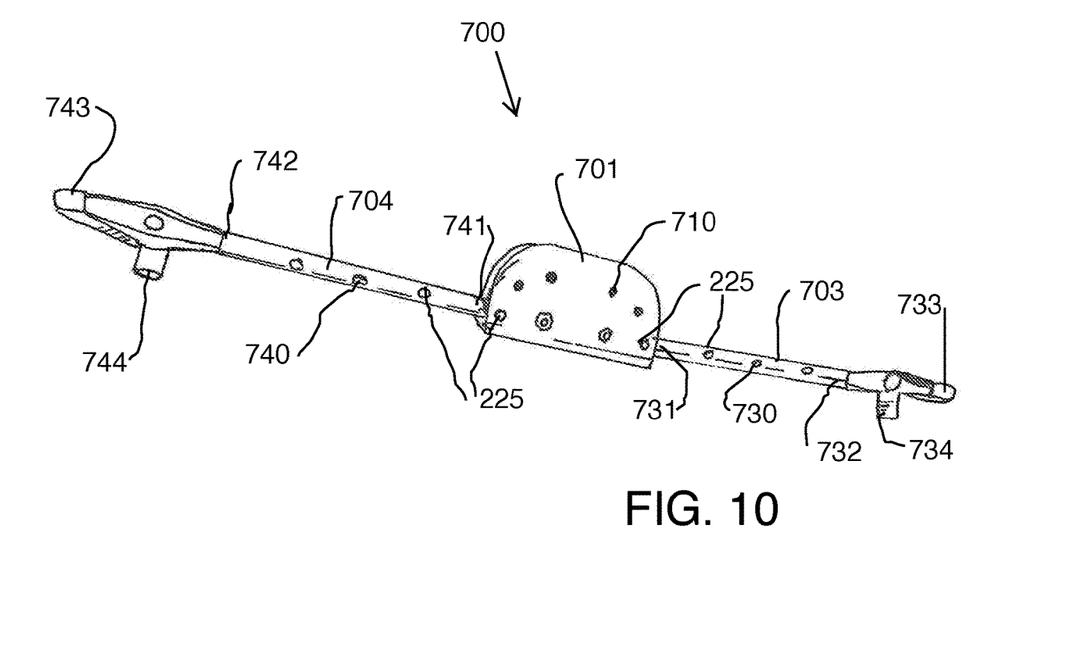
FIG. 10 is an isometric view of a first side of a second embodiment of a snowmobile attachment device, according to the present invention.

The hinge 603 comprised generally of a hinge plate affixed to the first arm 601 and second arm 602. The hinge 603 including a connector 630 designed for engagement with the attachment end 200 and positioned perpendicular to the length of the device 600. The connector 630, is preferably a the male end of an air fitting coupler such as a type A, type M, or type V Milton style fitting or other similar fitting.

Referring now to FIGS. 10-14, in a second embodiment of a snowmobile attachment device 700 according to the present invention and designed for engagement with one of the attachment ends 200 of the bar 100 of the present invention and for securing to a snowmobile. The attachment device 700 is comprised of a pair of plate members 701, 702, positioned in a spatial opposition and sandwiching a first arm 703 and a second arm 704, wherein the plate members 701, 702 provide an attachment location to allow for hinged movement of the first arm 703 and second arm 704, wherein the first arm 703 and second arm 704 are movable from a folded position to an extended position. The first plate 701 includes an arcuate shaped edge generally defining an arc for movement of the first arm 703 and second arm 704 along the arc. Accordingly, the first plate 701 includes a plurality of apertures 710 positioned along the arcuate edge and designed to engage the end cap 225 of the spring-loaded fastener 106, wherein the first arm 703 and second arm 704 can be moved to a fixed position along the arc. Preferably, the first plate 701 includes at least six apertures 710, allowing for each of the first end 703 and second end 704 to be fixed in an extended position, an angular position, and a folded position.

The first arm 703 having an attached end 731 and free end 732 opposed the attached end 731, the distance between the attached end 731 and free end 732 defining the length of the first arm 703. The length of the first arm 703 adjustable, wherein the first arm 703 is comprised of a movable arm received within a hollow tubular body. The first arm 703 length movable through communication between a plurality of apertures 730 and spring-loaded fastener 106 end cap 225. The free end 732 includes a hoop end 733. The hoop end 733 movable from an open to a closed position secured through a lock 734 and designed to secure one ski handle/loop B2 of the ski of a snowmobile.

The second arm 704 having an attached end 741 and free end 742 opposed the attached end 741, the distance between the attached end 741 and free end 742 defining the length of the second arm 704. The length of the second arm 704 adjustable, wherein the second arm 704 is comprised of a movable arm received within a hollow tubular body. The second arm 704 length movable through communication between a plurality of apertures 740 and spring-loaded fastener 106 end cap 225. The free end 742 includes a hoop end 743. The hoop end 743 movable from an open to a closed position secured with a lock 744 and designed to secure one ski handle/loop of the ski of a snowmobile opposite the hoop end 733 of the first arm 703, wherein the device 700 spans the distance between the snowmobile skis and engages the individual ski handle/loop. The attached end 741 of the second arm 704 positioned adjacent the attached end 731 of the first arm 703 between the plates 701 and 702 when in the extended position, wherein the extended length of the attachment is the distance between the free end 732 and free end 742 and adjusted to span the skis. The apertures 710 of the first plate 701 allow the arms to be positioned in multiple configurations for a number of different ski shapes, sizes, and distances.

Figure 11:
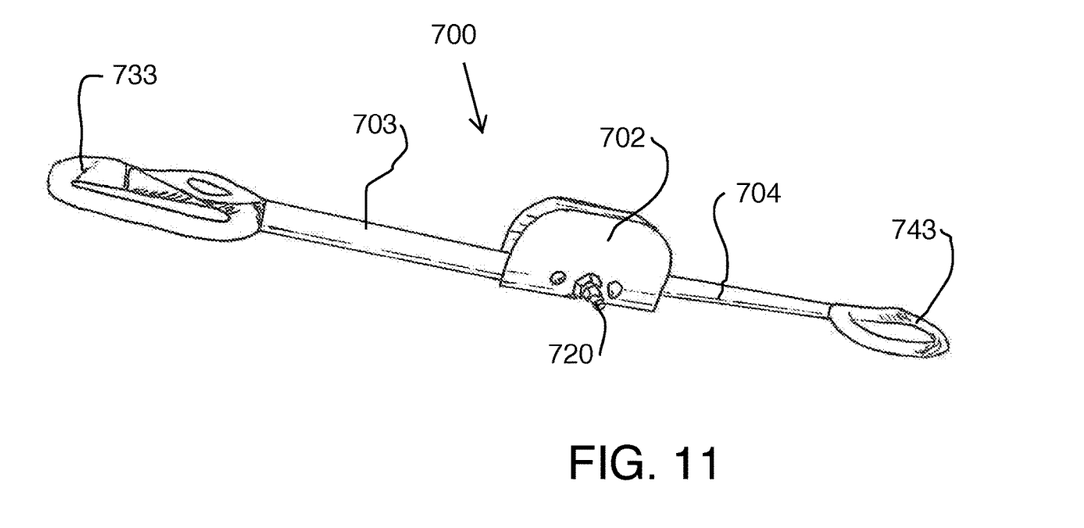
FIG. 11 is an isometric view of a second side of the second embodiment of a snowmobile attachment device, according to the present invention.
Figure 12:
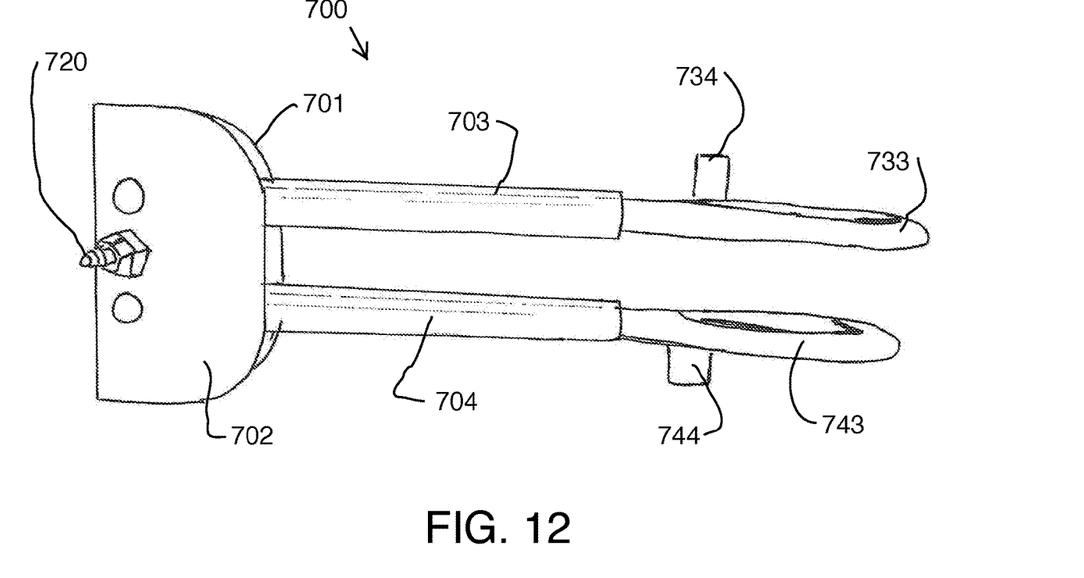
FIG. 12 is an isometric view of the first side of the second embodiment of a snowmobile attachment device in a folded position, according to the present invention.
Figure 13:
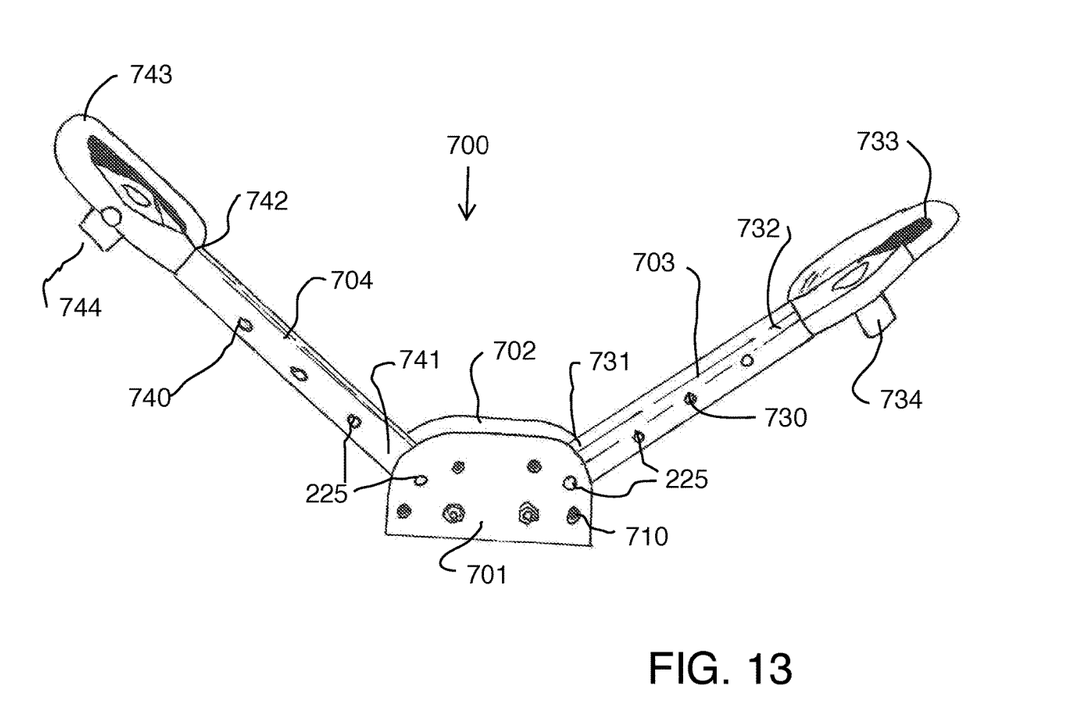
FIG. 13 is an isometric view of the second side of the second embodiment of a snowmobile attachment device in a partially extended position, according to the present invention.
Figure 14:
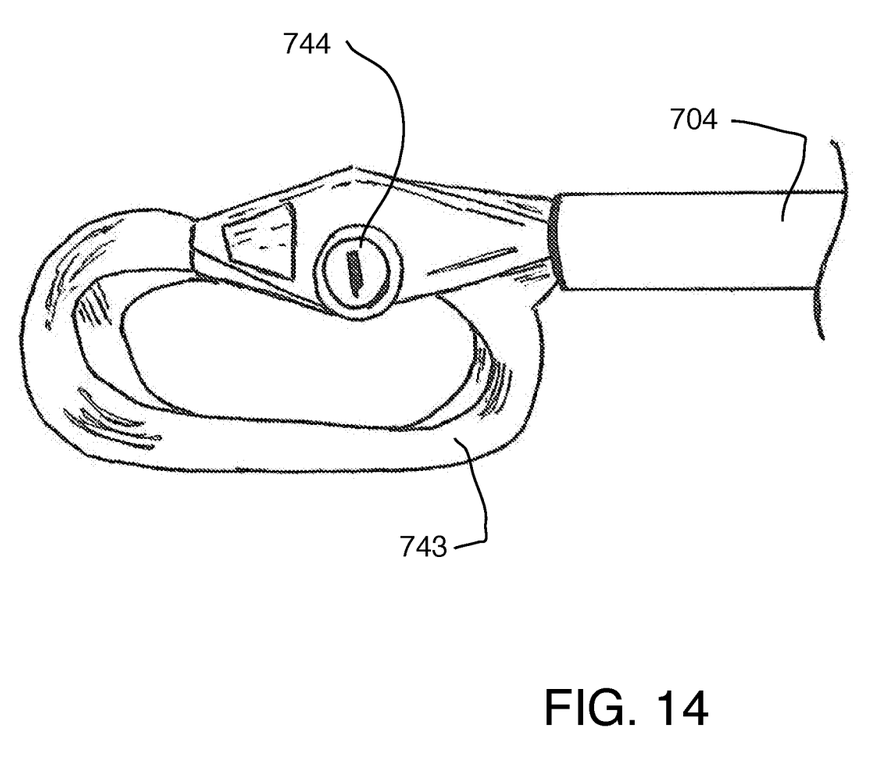
FIG. 14 is a side view of a pair of ends of the second embodiment of a snowmobile attachment device, according to the present invention.
Figure 15:
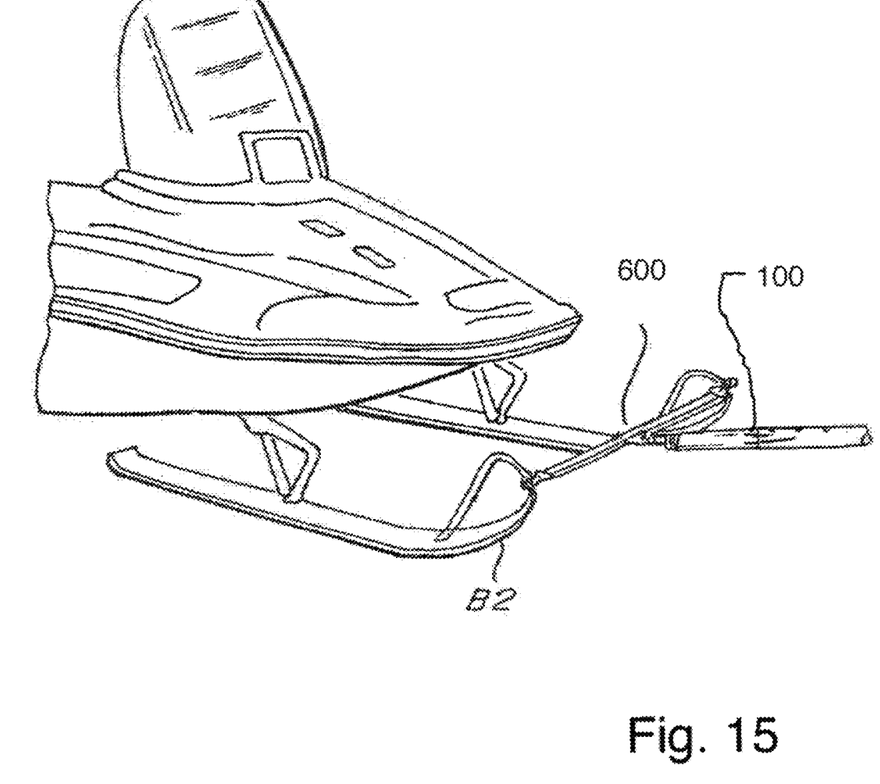
FIG. 15 is an isometric view of the first embodiment of the snowmobile attachment device engaged with a snowmobile, according to the present invention.
Figure 16:
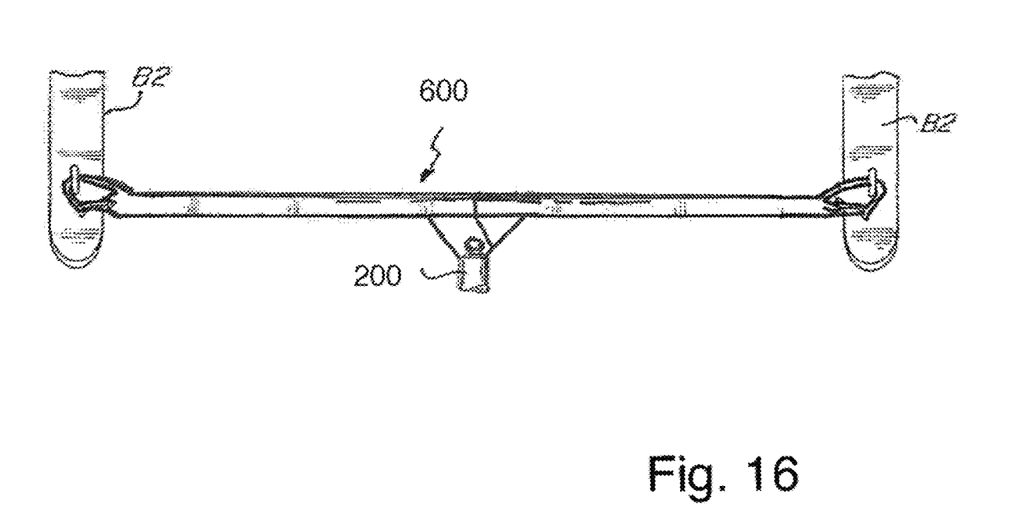
FIG. 16 is a top view of the first embodiment of the snowmobile attachment device engaged with a snowmobile, according to the present invention.

The second plate 702 is positioned opposite the first plate 701 includes a connector 720 designed for engagement with the attachment end 200 and positioned perpendicular to the length of the device 700. The connector 720, is preferably a the male end of an air fitting coupler such as a type A, type M, or type V Milton style fitting or other similar fitting and positioned at a center of the second plate 702.

Figure 17:
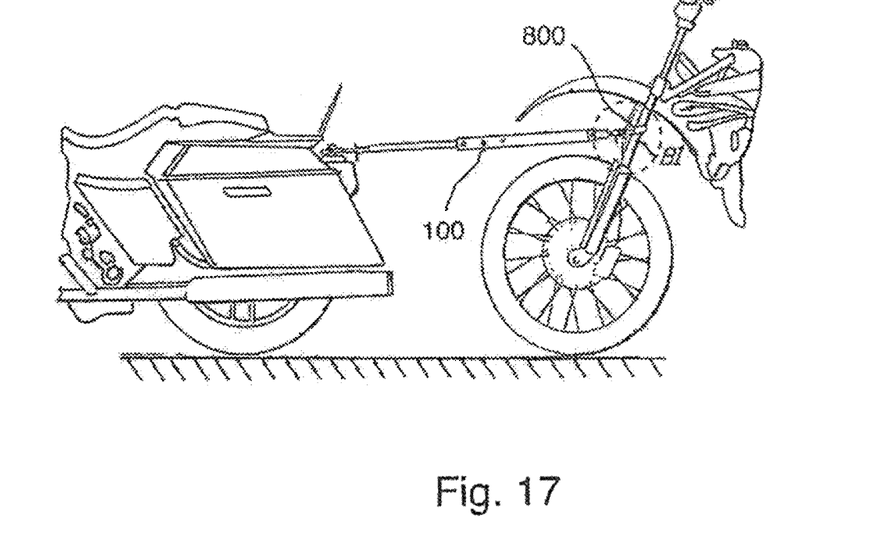
FIG. 17 is a side view of a motorcycle towing a motorcycle with a motorcycle connector, according to the present invention.
Figure 18:
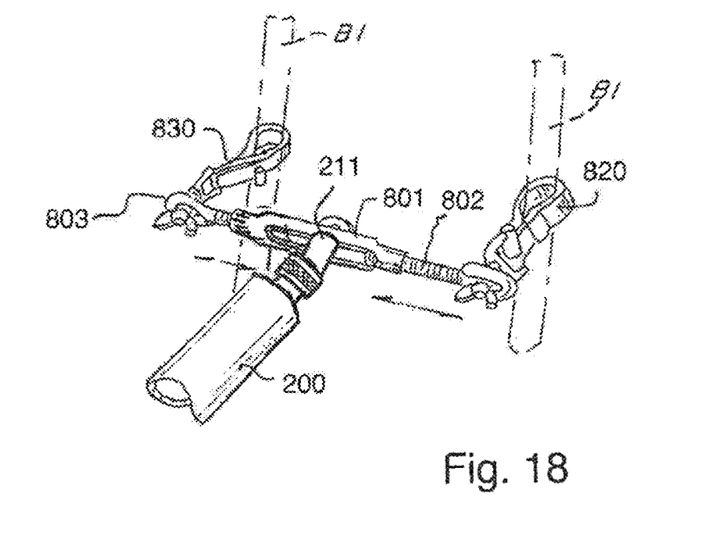
FIG. 18 is a detailed view of the circle area of FIG. 17, according to the present invention.

Referring now to FIGS. 17-18, a side view of a motorcycle attachment 800 device to allow for towing of a motorcycle with the collapsible/expandable tow bar 100 of the present invention. The motorcycle attachment 800 device of the present invention generally comprised of a turnbuckle-like device comprised of a central portion 801 to receive a fastener end 211 that is correspondingly received within a complimentary fastener on the attachment end 200. The motorcycle attachment 800 includes a pair of arms 802, 803 coupled to the central portion 801 co-planar and adjustable, wherein the width of the attachment 800 is adjustable to span the width of the fork tubes BI of a motorcycle fork assembly. Each of the arms 802, 803 include a corresponding strap 820, 830 in an opposed position to wrap and secure the opposed fork tube BI.

In the preferred embodiment of the present invention, the motorcycle attachment 800 device arms 802, 803 are comprised of a threaded rod received within the central portion 801 and movable to span the fork tubes BI. The fastener 211, is preferably the male end of an air fitting coupler such as a type A, type M, or type V Milton style fitting or other similar fitting.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling with the scope of the appended claims.

The invention claimed is:

1. A towing connector for engagement with the ski handle of a snowmobile ski, the connector comprising:
    a first arm, the first arm having a length, the length adjustable, the first arm having a first end, a second end opposite the first end, the second end having a hoop portion, the hoop portion sized to engage a ski loop positioned on a ski of the snowmobile;
    a second arm, the second arm having a length, the length adjustable, the second arm having a first end, the second end opposite the first end, the second end having a hoop portion, the hoop portion sized to engage an opposed ski handle of the hoop portion of the first arm, the second arm first end hingedly connected to the first arm through connection to a hinge plate;
    the hinge plate receiving the first arm first end and second arm first end, the hinge plate having a connector, the connector extending perpendicular to the length of the first arm and the second arm; and
    a pair of hoop ends, each hoop end positioned on an opposed second end of the first arm and the second arm, each hoop end sized for receipt around the ski handle portion of the skis of the snowmobile, wherein the hinge plate connector is the male portion of an air fitting-style connector.

2. A towing connector for engagement with the opposed fork tubes of a motorcycle, the towing connector comprising:
    a central connecting portion, the central connecting portion having opposed ends; a pair of opposed arms, each arm of the opposed arms coupled to an opposed end of the central connecting portion and extending a width, the width adjustable, each arm including a strap portion opposed to the central connecting portion, the strap portion capable of wrapping a fork tube of a motorcycle; and
    a connector, the connector coupled to the central connecting portion, wherein the connector is the male portion of an air fitting-style connector.

* * * * *